(12) United States Patent
Mulla et al.

(10) Patent No.: US 6,185,660 B1
(45) Date of Patent: Feb. 6, 2001

(54) PENDING ACCESS QUEUE FOR PROVIDING DATA TO A TARGET REGISTER DURING AN INTERMEDIATE PIPELINE PHASE AFTER A COMPUTER CACHE MISS

(75) Inventors: Dean A. Mulla, Fort Collins, CO (US); Sorin Iacobovici, San Jose, CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 08/935,681

(22) Filed: Sep. 23, 1997

(51) Int. Cl.[7] ........................................ G06F 12/00
(52) U.S. Cl. ..................... 711/140; 711/108; 711/119; 711/137; 711/144; 711/169; 711/146; 712/23; 708/233
(58) Field of Search ................................ 711/138, 140, 711/117, 125, 118, 154, 158, 167, 168, 169, 108, 119, 137, 144–146, 214–219; 712/23, 218; 708/233

(56) References Cited

U.S. PATENT DOCUMENTS

| | | | |
|---|---|---|---|
| 3,938,097 | * | 2/1976 | Niguette, III ........................ 711/128 |
| 4,851,993 | * | 7/1989 | Chen et al. ........................ 711/138 |
| 4,942,518 | * | 7/1990 | Weatherford et al. ............... 711/138 |
| 5,233,702 | * | 8/1993 | Emma et al. ........................ 711/118 |
| 5,317,718 | | 5/1994 | Jouppi ................................. 395/464 |
| 5,404,484 | * | 4/1995 | Schlansker et al. ................. 711/133 |
| 5,423,016 | | 6/1995 | Tsuchiya et al. .................... 395/425 |
| 5,454,093 | * | 9/1995 | Abdulhafiz et al. ................ 711/133 |
| 5,471,598 | * | 11/1995 | Quattromani et al. ............... 711/122 |
| 5,590,310 | * | 12/1996 | Willenz et al. ..................... 711/146 |
| 5,826,052 | * | 10/1998 | Stiles et al. ......................... 712/205 |
| 5,900,011 | * | 5/1999 | Saulsbury et al. .................. 711/119 |

OTHER PUBLICATIONS

"Pentium Processors and Related Products", Intel Corp, pp 2–82 thru 2–85, 1995.*
Mano, M. Morris, "Computer System Architecture", Prentice–Hall, Inc., pp 153 & 163, 1976.*

* cited by examiner

Primary Examiner—Do Hyun Yoo
Assistant Examiner—Hong Kim
(74) Attorney, Agent, or Firm—Augustus W. Winfield

(57) ABSTRACT

An apparatus in a computer, called a pending access queue, for providing data for register load instructions after a cache miss. After a cache miss, when data is available for a register load instruction, the data is first directed to the pending access queue and is provided to an execution pipeline directly from the pending access queue, without requiring the data to be entered in the cache. Entries in the pending access queue include destination register identification, enabling injection of the data into the pipeline during intermediate pipeline phases. The pending access queue provides results to the requesting unit in any order needed, supporting out-of-order cache returns, and provides for arbitration when multiple sources have data ready to be processed. Each separate request to a single line is provided a separate entry, and each entry is provided with its appropriate part of the line as soon as the line is available, thereby rapidly providing data for multiple misses to a single line. The pending access queue may optionally include observability bits, enabling pending releases to complete execution before associated awaited data is present within the pending access queue. The pending access queue may optionally be used to include data to be stored by store instructions that have resulted in a cache miss.

4 Claims, 1 Drawing Sheet

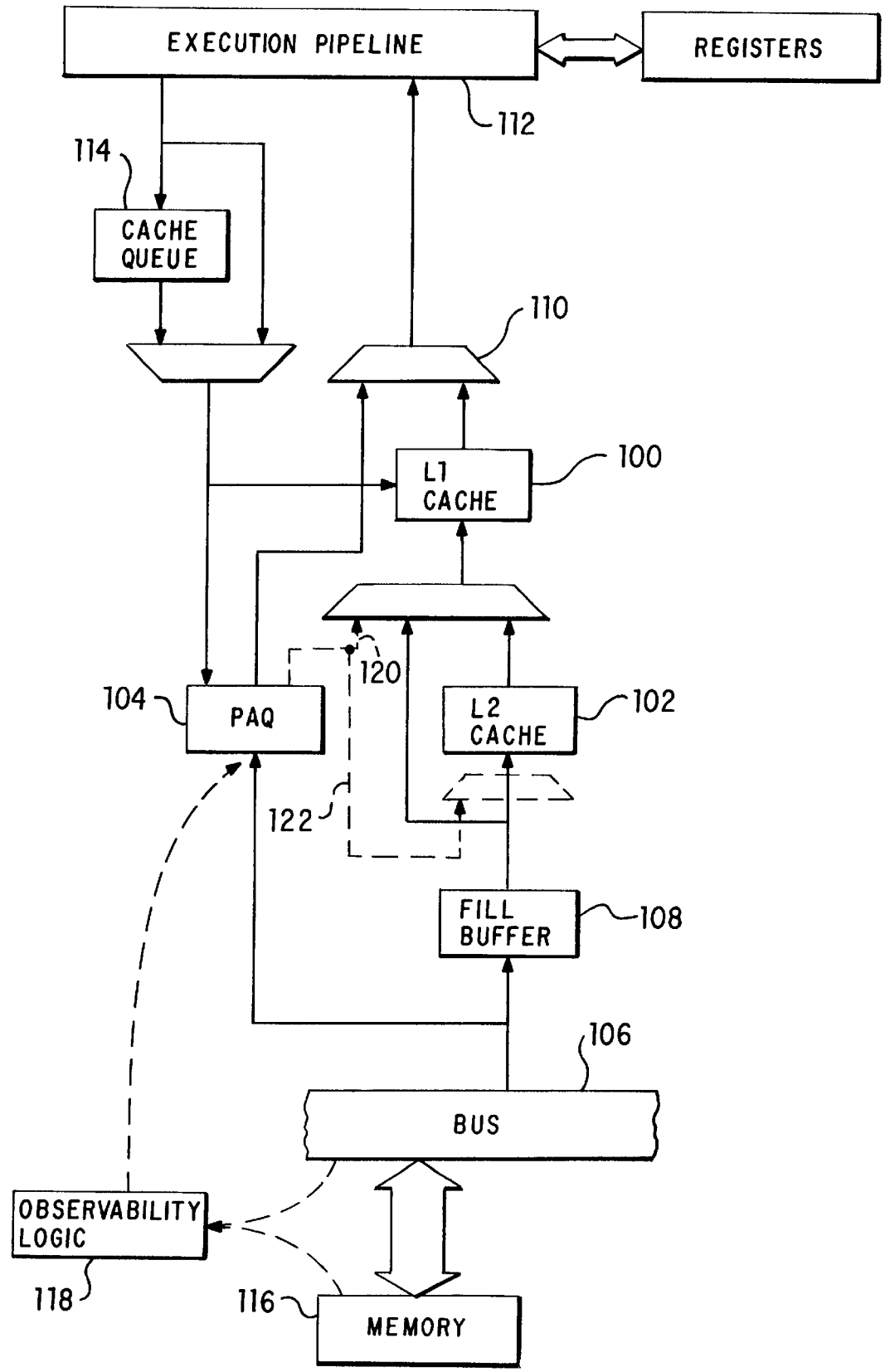

PENDING ACCESS QUEUE FOR PROVIDING DATA TO A TARGET REGISTER DURING AN INTERMEDIATE PIPELINE PHASE AFTER A COMPUTER CACHE MISS

FIELD OF INVENTION

This invention relates generally to computer systems, and more specifically to random access memory systems for computers, and more specifically to reducing the time required to provide requested items to a processor after a cache miss.

BACKGROUND OF THE INVENTION

Most computer systems employ a multilevel hierarchy of memory systems, with relatively fast, expensive, limited-capacity memory at the highest level of the hierarchy and proceeding to relatively slower, lower cost, higher-capacity memory at the lowest level of the hierarchy. The goal of a memory hierarchy is to reduce the average memory access time. Typically, the hierarchy includes a small fast memory called a cache, either physically integrated within a processor integrated circuit or mounted physically close to the processor for speed. A memory hierarchy is cost effective only if a high percentage of items requested from memory are present in the highest levels of the hierarchy (the levels with the shortest latency) when requested. If a processor requests an item and the item is present in the cache, the event is called a cache hit. If a processor requests an item and the item is not present in the cache, the event is called a cache miss. In the event of a cache miss, the requested item is retrieved from a lower level (a level with longer latency) of the memory hierarchy. This may have a significant impact on performance. In general, processor speed is increasing faster than memory speed, so that the relative performance penalty for a cache miss is increasing over time.

The average memory access time may be reduced by improving the cache hit/miss ratio, reducing the time penalty for a miss, and reducing the time required for a hit. The present patent document is primarily concerned with reducing the time penalty for a cache miss.

In many computer systems, multiple instructions overlap in execution in a technique called pipelining. In pipelining, instruction execution is broken down into small parts, called stages or phases, each of which takes a fraction of the overall time required to complete an entire instruction. After a first instruction has completed a first stage or phase and has entered the second stage or phase, a second instruction starts the first stage. At any given time, there may be many instructions overlapped in execution, each in a different phase of completion. The effective instruction rate then becomes the rate at which instructions exit the pipeline. Alternatively, computer systems may issue multiple instructions simultaneously. These systems are called superscalar machines. A variation is very long instruction word machines in which a single instruction includes multiple operations. Finally, there are systems with multiple processors that may share memory. Of course, there are combinations of all these and in particular there are superscalar pipelined machines. Simultaneous execution and overlapping execution assume independent instructions or operations. In contrast, if one operation requires a computational result from another operation, the two operations must be executed sequentially. Typically, the burden is placed on the compiler for presenting independent operations to the hardware. In an environment of simultaneous and overlapping instruction execution, a cache miss can create a substantial problem, possibly stalling many instructions.

The minimum amount of memory that can be transferred into or out of a cache is called a line, or sometimes a block. Typically, memory is organized into words (for example, 32 bits per word) and a line is typically multiple words (for example, 16 words per line). Memory may also be divided into pages, with many lines per page.

Various strategies may be employed to minimize the effects of cache misses. For example, buffers are sometimes placed between a cache and other lower level memory. These buffers typically fetch a block or line of sequential addresses including the miss address, assuming that addresses immediately following the miss address will also be needed. In U.S. Pat. No. 5,317,718 (Jouppi), a buffer called a stream buffer is placed between a cache and lower level memory. In Jouppi, items are stored in the buffer until another cache miss (if ever), and items then go from the buffer into the cache, not directly to the processor. The stream buffer described in Jouppi reduces the impact of a cache miss by rapidly loading a block of items that are likely to be needed by the processor in addition to the specific request resulting in a cache miss. Effectively, the stream buffer increases the block size. For interleaved processes, Jouppi proposes multiple stream buffers, each with a different starting address, replaced on a least-recently-used basis. In U.S. Pat. No. 5,423,016 (Tsuchiya et al), a buffer is provided that holds a single block of data. In Tsuchiya, items in the single block in the buffer are available to the processor directly from the buffer, without having to be placed into the cache. If the block of data is accessed again before being transferred to the cache, the access request is serviced directly from the block buffer. For one block, the buffer described in Tsuchiya et al enhances performance relative to Jouppi by making items in the buffer directly available to the processor without having to first place them in the cache.

There is a need for further cache miss penalty reduction, particularly for multiple misses with out of order execution and multiple misses to the same line.

SUMMARY OF THE INVENTION

A content addressable memory, called a Pending Access Queue (PAQ), is used to hold multiple processor initiated accesses, with a register destination (register load instructions), that miss a cache. The PAQ captures data arriving from lower levels as soon as the data is available.

Each PAQ entry holds enough data for the largest data item that needs to be supplied for a register destination (a double word). In addition, each PAQ entry holds all the relevant information required to support returns to the requesting unit and to support request ordering constraints. In particular, in addition to address, each PAQ entry holds the identification of the destination register and the data field of interest within a line. If there is more than one access to a single line, each separate access is given a separate entry in the queue, and all such entries for a single line are simultaneously provided with the appropriate part of the line as soon as the line is available. Finally, the pending access queue provides arbitration of the return path for multiple entries having data ready to be processed.

Providing entries for multiple misses to a single memory line is particularly useful for instructions accessing sequential areas of memory, such as procedure entry and exit boundaries. At these events, several registers are typically sequentially saved or restored and the memory addresses are sequential.

The PAQ provides the following benefits:

(a) Data is available directly from the queue without having to first place the data into the cache.

(b) Each separate request to a single line is provided a separate entry, and each entry is provided with its appropriate part of the line as soon as the line is available.

(c) The queue provides results to the requesting unit in any order needed, supporting out-of-order cache returns, and provides for arbitration when multiple sources have data ready to be processed.

BRIEF DESCRIPTION OF THE DRAWINGS

The FIGURE is a block diagram of an example embodiment of a computer system including a pending access queue in accordance with the invention.

DETAILED DESCRIPTION OF THE PREFERRED EMBODIMENT OF THE INVENTION

The FIGURE is a simplified block diagram of an example embodiment of a computer system in accordance with the invention. The figure depicts part of one processor in a pipelined system. There may be multiple processors. Each processor includes a primary (L1) cache 100. Each processor may have a optional lower level (L2) cache 102. When a memory access with a register destination misses the L1 cache (or both caches if an L2 cache is present), the address, size, destination register and other information are entered into an associated PAQ 104. Each PAQ has space for multiple entries for multiple misses. Each missed line is subsequently retrieved from a lower level of the memory hierarchy. The lower level may be shared random access memory interconnected over a system bus 106 or the lower level may be peripheral devices such as disks. Complete lines from lower levels of the memory hierarchy are buffered (108). As soon as a line is available to a buffer, an associated PAQ entry receives an appropriate data field within the line (for example, a word or double word) required to satisfy a pending access. Pending accesses are satisfied directly by the PAQ rather than the L1 cache. If there are multiple pending accesses for the same line, each corresponding entry in the PAQ receives its required data field directly from the bus, bypassing the fill buffer 108. A multiplexer 110 selects bypass data from either the PAQ or the L1 caches for data to be entered into an execution pipeline 112.

Pipelined instructions requiring data fetches are queued in a cache queue 114. If the data is available in the L1 cache or the L2 cache the data is provided by the caches via multiplexer 110. If there is a cache miss in both caches, the data address, size, destination register and other information are entered into the PAQ for future satisfaction by the PAQ.

The PAQ includes a content addressable memory (CAM) along with additional random access memory (RAM) or data register cells. The fields in the PAQ are as follows:

(a) physical address (b) access type (load/store/both/semaphore/neither/ prefetch)

(c) access size (in bytes)

(d) target register(s)

(e) data (f) observability bit (optional)

The physical address is stored in the CAM. The remaining items are stored in separate RAM or data register cells. When a data fetch instruction is entered into the PAQ, all the fields except the data field are entered.

The following table illustrates various stages of a representative pipelined processor. Various processors may have variations of the stages. In addition, there may be multiple clock phases per stage so that some of the activities illustrated as occurring in different stages actually occur in different phases of one stage. However, Table 1 is not intended to be interpreted literally and instead is intended to simply illustrate the general flow. In a first stage an instruction address is generated. Next, an instruction cache is accessed. Assuming an instruction cache hit, the instruction is fetched from the cache and decoded. In the case of an integer arithmetic instruction involving only registers, the arithmetic operation may be completed in the next stage (stage 4). Alternatively, in the case of a memory reference, such as load and store instructions, the target address is generated during stage 4. The data cache address is then decoded. Assuming a cache hit, the data is available from the cache or to the cache during stage 6. Finally, in case of a register load instruction, the data is written into the register during stage 7.

TABLE 1

| STAGE | OPERATION |
| --- | --- |
| 0 | FETCH ADDRESS |
| 1 | ACCESS INSTRUCTION CACHE |
| 2 | INSTRUCTION AVAILABLE |
| 3 | INSTRUCTION DECODE |
| 4 | INTEGER ARITHMETIC/ DATA ADDRESS |
| 5 | DATA CACHE ADDRESS |
| 6 | LOAD AND STORE DATA |
| 7 | REGISTER WRITE |

The present patent document is primarily concerned with register load instructions. With pipeline stages as in Table 1, some instructions such as branch instructions and arithmetic operations are finished at the end of stage 4. If there is an instruction in the pipeline that is completed before stage 6, and if data is available in the PAQ from a previous cache miss, there is an opportunity to bypass the cache and "inject" that data into the pipeline during stage 7 without having to restart the corresponding register load instruction at the beginning of the pipeline. The PAQ stores the target register identification in addition to data to enable the data to be injected at an intermediate stage of the pipeline. If data is available in the PAQ, and the "register write" stage of the pipeline is idle, multiplexer 110 provides the data and target register information from the PAQ.

The PAQ also provides a way for choosing among multiple entries. For example, one straightforward high performance algorithm is to use two levels of first-in-first-out. The first level is the order in which lines are received by the PAQ and the second level is the order in which line entries were earlier requested. That is, the PAQ may provide the first retrieved line first. In case there are multiple entries for the same line, the PAQ may provide the first request first. Therefore, the PAQ enhances performance by providing data as soon as it is available regardless of instruction order.

Caches in accordance with the invention are non-blocking. That is, in case of a cache miss, the processor may proceed to perform other memory accesses. Some memory access instructions can be done in any order as long as software cannot perceive a difference. However, two special categories require sequential execution, as follows. Acquires (also called strong loads) are forward looking, requiring the acquire instruction to be sufficiently completed (data must be present at specified parts of the system) before subsequent data access instructions can be completed. Releases (also called strong stores) are backward looking, requiring previous memory accesses to be sufficiently completed before the release instruction is completed. Note that in general, a release access may not actually need data, but merely requires that previous instructions are sufficiently complete for the access to be initiated. Multiple parts of the system include bits (called global observability bits) that may be monitored to see if acquires and releases have been sufficiently completed. In particular, memory lower in the hierarchy (116) may include logic structures (observability logic 118) to signal when data has been retrieved and these signals may be available before the data is placed onto bus 106 and before the data is placed into the PAQ.

At a lowest performance option, the presence of data in the PAQ signals observability. In addition, for performance enhancement, the PAQ may include observability bits that can be set by logic structures associated with lower level caches or memory or bus 106. Observability bits in the PAQ enhance performance at the expense of complexity. If the PAQ does not include observability bits, then a release must wait on the presence of data in the PAQ for all dependent accesses before the release can be completed. If the PAQ does include observability bits, then a release access may proceed as soon as the observability bits are set, which in general will be before data has reached the PAQ. In each case, there are at least 3 possible design alternatives for handling releases. First, assume that the PAQ has no observability bits. Note that the release does not need the data, but needs to know that the data is present. One design alternative is to simply stall the pipeline until the required data is present in the PAQ. This is the least desirable alternative from a performance point of view. A second alternative is to prevent a release from entering the execution pipeline until the required data is present in the PAQ. There are computers for certain classes of applications where this is the preferred alternative, but in general this is not the alternative with the best performance. The third design alternative is to hold pending releases in the cache queue 114 until the PAQ has the required data. The third alternative provides the best performance of the three alternatives because the releases have completed some phases of the pipeline and because other cache accesses are allowed to pass the release access.

Now consider the above three alternatives with observability bits in the PAQ. PAQ observability bits may be set by hardware associated with bus 106 or associated with random access memory so that the observability bits are set before the data is available to the PAQ. This means that for each of the 3 design alternatives, a pending release access can proceed as soon as an observability bit is set in the PAQ instead of waiting for data to be actually present in the PAQ. For maximum performance, the PAQ should include observability bits and pending partially executed releases should be held in the cache queue.

Multi-processor systems may have multiple processors sharing memory. Data for a particular address may exist at several different locations, including caches, buffers and in the present invention within a PAQ. In general, if data for a particular address is modified in one location, and is then requested by another processor, the most recently modified data must be identified. This is referred to as coherency. One method of ensuring coherency is to send an address, called a snoop address, to every location in which the data might be found. A snoop hit occurs for every match, and corrective action may be necessary to maintain coherency. For further information, see for example, U.S. Pat. No. 5,652,859. In general, the PAQ contains data references satisfied by other hardware structures that participate in snoop requests and there is no need for the PAQ to participate in snoop requests.

The PAQ may be used for further performance enhancement as follows. Cache queue 114 was described above as being used for pending data fetches. Cache queue 114 (or a similar separate store queue) may be used for pending store instructions. Once a store instruction has missed, the store can be moved to the PAQ instead of leaving it in the cache queue or store queue. Note that for a store instruction, the data is entered into the PAQ at the time of entry of the rest of the fields of the PAQ. Then, store data to a line may be merged by the PAQ with line data being fetched from a lower level cache or memory. This is depicted in the figure by dashed paths 120 and 122 (only one of the two paths is needed). The line data for a store entry in the PAQ bypasses the fill buffer 108 and the optional lower level cache 102 for improved performance. In addition, observability bits in the PAQ for store instructions may enable dependent instructions to proceed.

The PAQ provides the following performance benefits. First, data is available directly from the PAQ without having to first place the data into the cache. Second, because each PAQ entry includes destination register information, data can be injected into an intermediate phase of the pipeline, thereby eliminating the need for waiting for instructions to enter or reenter the pipeline. Third, each separate request to a single line is provided a separate entry, and each entry is provided with its appropriate part of the line as soon as the line is available, thereby rapidly providing data for multiple misses to a single line. Fourth, the PAQ provides results to the requesting unit in any order needed, supporting out-of-order cache returns, and provides for arbitration when multiple sources have data ready to be processed. Finally, the PAQ may include observability bits, thereby enabling pending release accesses to complete execution before data is present within the PAQ for dependent load accesses.

The PAQ has been described in the context of a specific cache design but it is not restricted to this specific cache design. It can be used with other cache designs and other cache hierarchies to fulfill the same functions. The number of entries in the PAQ will vary from system to system but in a particular embodiment it is contemplated that it will support 16–32 outstanding register targets.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A computer system comprising:
   an execution pipeline;
   a cache coupled to the execution pipeline;
   a queue structure coupled to the execution pipeline; and
   the queue structure sending data and an identification of a target register for the data to the execution pipeline, for an instruction to load the data into the target register, the data not present in the cache.

2. The computer system of claim 1 further comprising:
   the queue structure having a capacity sufficient to store multiple data entries and adapted to send the entries to the execution pipeline in any order.

3. The computer system of claim 1 further comprising:
   the queue structure having a capacity sufficient to separately store multiple references to a single line and adapted to store all the entries for the single line from a single retrieval of the single line from a memory.

4. The computer system of claim 1 further comprising:
   the queue structure including storage for observability bits, thereby enabling a pending release to complete execution before data being awaited by the pending release is present within the queue structure.

* * * * *